US012633205B1

(12) United States Patent
Stansbury

(10) Patent No.: US 12,633,205 B1
(45) Date of Patent: May 19, 2026

(54) SYSTEM AND METHOD FOR MANAGING SUPPLY CHAIN RISK

(71) Applicant: Exiger Holdings, Inc., New York, NY (US)

(72) Inventor: Trevor Stansbury, Loveland, OH (US)

(73) Assignee: EXIGER HOLDINGS, INC., New York, NY (US)

( * ) Notice: Subject to any disclaimer, the term of this patent is extended or adjusted under 35 U.S.C. 154(b) by 79 days.

(21) Appl. No.: 18/823,028

(22) Filed: Sep. 3, 2024

Related U.S. Application Data

(60) Provisional application No. 63/579,845, filed on Aug. 31, 2023.

(51) Int. Cl.
| | |
|---|---|
| *G08B 21/18* | (2006.01) |
| *G06Q 10/0635* | (2023.01) |
| *G06Q 10/083* | (2023.01) |

(52) U.S. Cl.
CPC ....... *G08B 21/182* (2013.01); *G06Q 10/0635* (2013.01); *G06Q 10/083* (2013.01)

(58) Field of Classification Search
CPC . G08B 21/182; G06Q 10/0635; G06Q 10/083
USPC ........................................................ 340/540
See application file for complete search history.

(56) References Cited

U.S. PATENT DOCUMENTS

| | | | | |
|---|---|---|---|---|
| 9,721,294 B1* | 8/2017 | Vakil | ...................... | G06Q 40/00 |
| 2013/0041713 A1* | 2/2013 | Henrich | ............. | G06Q 10/0635 |
| | | | | 705/7.28 |
| 2013/0275176 A1* | 10/2013 | Brown | ............... | G06Q 10/0635 |
| | | | | 705/7.28 |
| 2014/0278728 A1* | 9/2014 | Hollenbach | ........ | G06Q 10/0635 |
| | | | | 705/7.28 |
| 2017/0262764 A1* | 9/2017 | Karuppasamy | ........ | G06N 5/025 |
| 2018/0197128 A1* | 7/2018 | Carstens | ............. | G06F 16/9024 |
| 2020/0272964 A1* | 8/2020 | Bajaj | ............... | G06Q 10/06315 |
| 2020/0327470 A1* | 10/2020 | Trim | .................. | G06Q 10/0635 |
| 2022/0058554 A1* | 2/2022 | Makhija | ................... | G06N 3/08 |

* cited by examiner

*Primary Examiner* — Kerri L Mcnally
(74) *Attorney, Agent, or Firm* — CANTOR COLBURN LLP

(57) ABSTRACT

Effecting supply-chain-risk-managing by: identifying part-source-pairs; retrieving data impacting shipping; obtaining a current risk status vector that is a function of a data-state and a data-freshness; utilizing the current risk status vector to: obtain risk weighting vectors by category and user-role, time decay, and source quality factor data; apply the risk weighting vectors, time decay and source quality factor data to the risk status vector to obtain a risk score by part-source-pair; applying the risk weighting vectors, the time decay and source quality data with the risk score by part-source-pair to obtain a confidence score by part-source pair; adjusting alarm threshold levels, based on the risk score by part-source-pair, and a number of the implicated parts, accounting for prior shipment results from the source, including arrival time, quantity and quality of the parts; issuing an alarm when the risk score, and a number of the implicated parts, is above the threshold.

20 Claims, 4 Drawing Sheets

SYSTEM AND METHOD FOR MANAGING SUPPLY CHAIN RISK

CROSS-REFERENCE

This Application claims priority to U.S. Provisional Application 63/579,845 filed Aug. 31, 2023, the entire contents of which are incorporated herein by reference.

BACKGROUND

The embodiments relate to risk management and more specifically to a system and method for managing supply chain risk.

BRIEF SUMMARY

Disclosed is a method for effecting supply chain risk managing (SCRM), the method includes utilizing an electronics controller to execute steps including: (I) identifying part-source pairs for parts that are being shipped by one or more sources; (II) for each part-source pair: (i) retrieving data from a plurality of databases that impact shipping and delivery; (ii) obtaining a current risk status vector for each part-source pair that is a function of a data state and a data freshness of the retrieved data; (iii) utilizing the current risk status vector to: (a) obtain, from respective databases, risk weighting vectors by category and user role, time decay and source quality factor data; and (b) apply the risk weighting vectors, time decay and source quality factor data to the risk status vector to obtain a risk score by part-source pair; and (c) store the risk score by part-source pair in a SCRM database; (iv) applying the risk weighting vectors and the time decay and source quality data with the risk score by part-source pair to obtain a confidence score by part-source pair; (v) storing the confidence score by part-source pair in the SCRM database; (III) evaluating, adjusting and storing alarm threshold levels, which are triggered based on the risk score by part-source pair, and a number of the parts subject to the part-source pair, and accounting for prior shipment results from the source, including arrival time, quantity and quality of the parts; and (IV) issuing an alarm when the risk score by part-source pair, and a number of the parts subject to the part-source pair, is above the alarm threshold level.

In addition to one or more aspects of the method or as an alternate, the databases include one or more of: a first database having cyber-attack data for the industry and/or the source of parts; a second database including supply availability data for the parts industry-wide and/or for the supplier; a third database including business credit scoring data for the source of parts; a fourth database including financial stability data for the source of parts; a fifth database including REACH/RoHS data; a sixth database including natural and man-made event data that impacts delivery; a seventh database including EAR/ITAR registry data for the parts; an eighth database including integral performance metric data for the source of parts; and a ninth database including design-to-manufacture control data for the parts, industry and/or the source of parts.

In addition to one or more aspects of the method or as an alternate, the natural event data identifies weather conditions and the man-made event data identifies roadwork schedules.

In addition to one or more aspects of the method or as an alternate, the risk weighting vectors by category are industry based or risk weighting vectors based on the source of parts.

In addition to one or more aspects of the method or as an alternate, the alarm threshold levels are ignore, monitor and expedite.

In addition to one or more aspects of the method or as an alternate, the method includes utilizing the adjusted alarm threshold data to execute scheduled report generation functions, which includes utilizing the SCRM results history by part-source pair, and the alarm threshold level data, and risk alarm override flag data from a respective database.

In addition to one or more aspects of the method or as an alternate, the method includes updating an interactive role-based SCRM viewer based on the risk alarm override flag data, the SCRM results history by part-source pair, and the alarm threshold level data.

In addition to one or more aspects of the method or as an alternate, the method includes receiving, as user input, one or more of an adjusting of parameters including weight of processed data that is obtained from the databases, setting alarm limits, adding and removing a source of parts, updating categories of data stored in the databases.

In addition to one or more aspects of the method or as an alternate, the method includes determining that a source of parts has updated a delivery status and responsively updating the risk alarm override flag.

In addition to one or more aspects of the method or as an alternate, the method includes transmitting the alert to a shipment management server for display on a server display.

Disclosed is a system that effects supply chain risk managing (SCRM), the system includes an electronics controller configured to execute steps including: (I) identifying part-source pairs for parts that are being shipped by one or more sources; (II) for each part-source pair: (i) retrieving data from a plurality of databases that impact shipping and delivery; (ii) obtaining a current risk status vector for each part-source pair that is a function of a data state and a data freshness of the retrieved data; (iii) utilizing the current risk status vector to: (a) obtain, from respective databases, risk weighting vectors by category and user role, time decay and source quality factor data; and (b) apply the risk weighting vectors, time decay and source quality factor data to the risk status vector to obtain a risk score by part-source pair; and (c) store the risk score by part-source pair in a SCRM database; (iv) applying the risk weighting vectors and the time decay and source quality data with the risk score by part-source pair to obtain a confidence score by part-source pair; (v) storing the confidence score by part-source pair in the SCRM database; (III) evaluating, adjusting and storing alarm threshold levels, which are triggered based on the risk score by part-source pair, and a number of the parts subject to the part-source pair, and accounting for prior shipment results from the source, including arrival time, quantity and quality of the parts; and (IV) issuing an alarm when the risk score by part-source pair, and a number of the parts subject to the part-source pair, is above the alarm threshold level.

In addition to one or more aspects of the system or as an alternate, the databases include one or more of: a first database having cyber-attack data for the industry and/or the source of parts; a second database including supply availability data for the parts industry-wide and/or for the supplier; a third database including business credit scoring data for the source of parts; a fourth database including financial stability data for the source of parts; a fifth database including REACH/RoHS data; a sixth database including natural and man-made event data that impacts delivery; a seventh database including EAR/ITAR registry data for the parts; an eighth database including integral performance metric data for the source of parts; and a ninth database including design-to-manufacture control data for the parts, industry and/or the source of parts.

In addition to one or more aspects of the system or as an alternate, the natural event data identifies weather conditions and the man-made event data identifies roadwork schedules.

In addition to one or more aspects of the system or as an alternate, the risk weighting vectors by category are industry based or risk weighting vectors based on the source of parts.

In addition to one or more aspects of the system or as an alternate, the alarm threshold levels are ignore, monitor and expedite.

In addition to one or more aspects of the system or as an alternate, the system includes the controller utilizing the adjusted alarm threshold data to execute scheduled report generation functions, which includes utilizing the SCRM results history by part-source pair, and the alarm threshold level data, and risk alarm override flag data from a respective database.

In addition to one or more aspects of the system or as an alternate, the system includes the controller updating an interactive role-based SCRM viewer based on the risk alarm override flag data, the SCRM results history by part-source pair, and the alarm threshold level data.

In addition to one or more aspects of the system or as an alternate, the system includes the controller receiving, as user input, one or more of an adjusting of parameters including weight of processed data that is obtained from the databases, setting alarm limits, adding and removing a source of parts, updating categories of data stored in the databases.

In addition to one or more aspects of the system or as an alternate, the system includes the controller determining that a source of parts has updated a delivery status and responsively updating the risk alarm override flag.

In addition to one or more aspects of the system or as an alternate, the system includes the controller transmitting the alert to a shipment management server for display on a server display.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
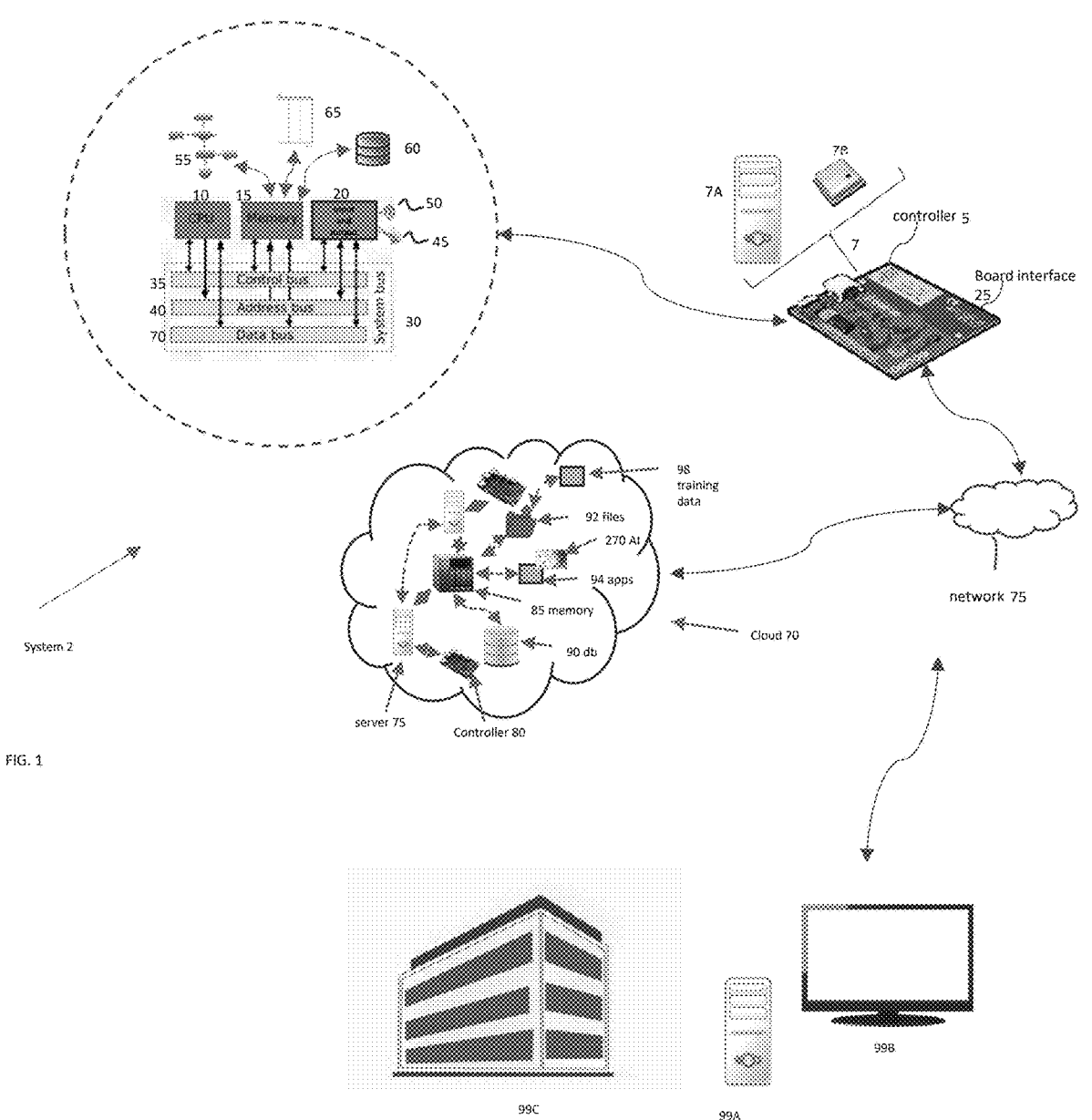
FIG. 1 shows a system that may be utilized in executing the disclosed method.

As shown in FIG. 1, the disclosed embodiments may reference a system 2 that utilizes a controller 5, which may be on a local computing device 7, such as a server 7A or other computing device 7B configured for edge computing. The controller 5 may include a processor 10 and non-volatile/non-transient memory 15, one or more input and/or output (I/O) device interface(s) 20 that are communicatively coupled via an onboard (local) interface 25 to communicate among other devices. The onboard interface 25 may include, for example but not limited to, an onboard system bus 30, including a control bus 35 (for inter-device communications), an address bus 40 (for physical addressing) and a data bus (for transferring data). That is, the system bus 30 may enable the electronic communications between the processor 10, memory 15 and I/O connections 20. The I/O connections 20 may also include wired connections 45 and/or wireless connections 50. The onboard interface 25 may have additional elements, which are omitted for simplicity, such as controllers, buffers (caches), drivers, repeaters, and receivers to enable electronic communications. The 15 may execute programs 55, access data 60, or lookup charts 65, or a combination of each, in furtherance of its processing, all of which may be stored in advance or received during execution of its processes by other computing devices, e.g., via a cloud service 70 over a network connection 75, e.g., with other processors.

The cloud service 70 may have servers 75 with respective controllers 80 similar to controller 5, non-transient memory 85 having a database 90, files 92, executable applications 94 including a machine learning model 96 trained on training data 98. Reference herein to a controller 5, depending on the context, may be to the controller 80 of the cloud service 70 or the local controller 5.

The system 2, according to the embodiments, may include a central management server 99A with a display 99B, for use by personnel at a hub 99C which oversees supply chain operations.

Figure 2:
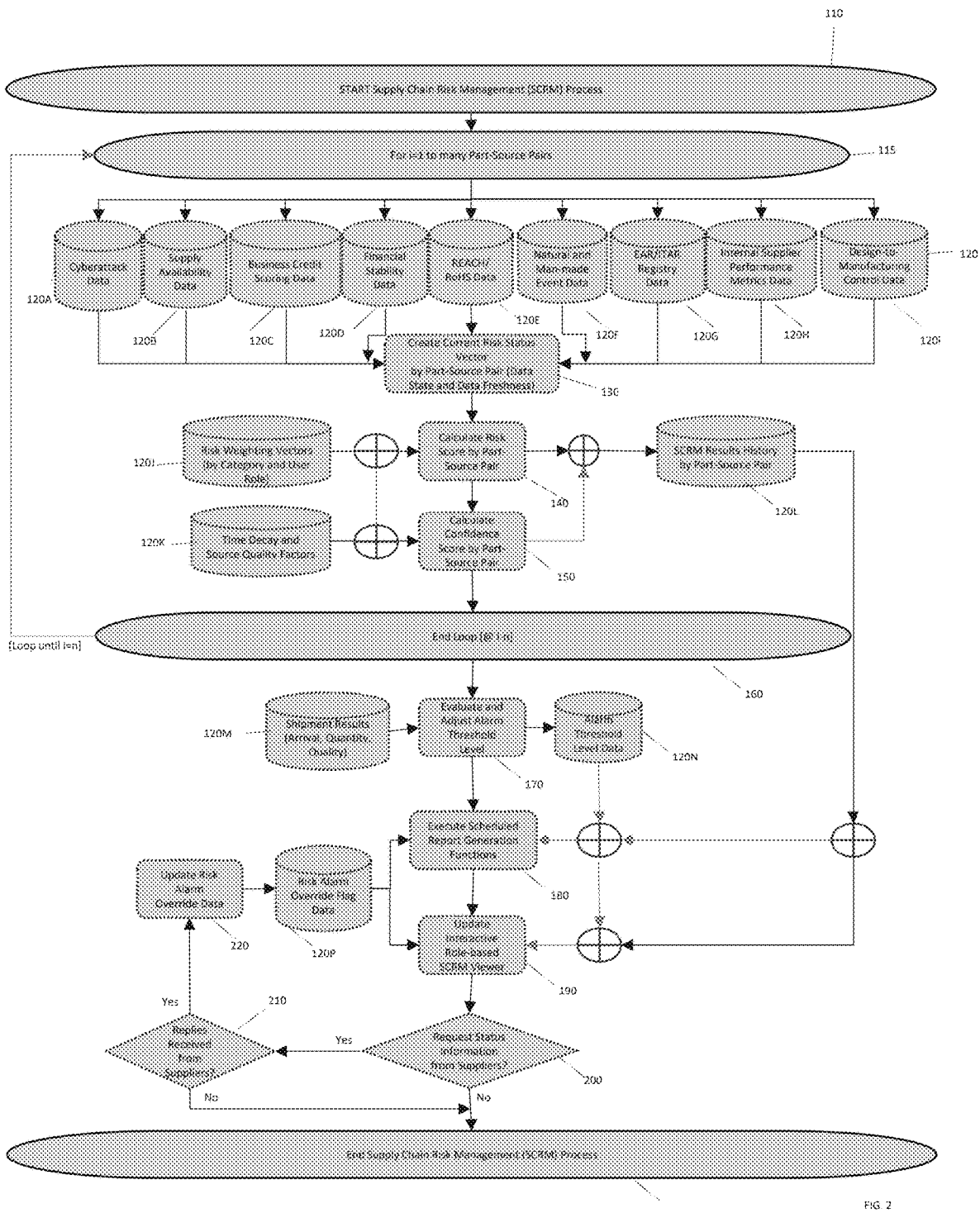
FIG. 2 is a flowchart showing a method of managing supply chain risk.

Turning to FIG. 2, the figure is a flowchart showing a method of managing supply chain risk, otherwise referred to as supply chain risk management (SCRM. The process may be executed by the controller 5, The controller 5 server may be located at a central hub 7A or may operate on a cloud 70 platform.

As shown in block 115 the method includes the system 2 identifying part-source pairs for parts that are being shipped by sources, and executing a risk analysis that repeats, or loops, for each part-source pair that is being shipped. As utilized herein, a source is the supplier of the part, such as a merchant, and the part is any part that may need to be shipped, e.g. via freight. There may be many parts and many suppliers. The loop repeats for each part-source pair up to "n" part-source pairs. Each loop execution is designated i, where i repeats from 1 to n, or n times.

During the loop 115, as shown in block 120, the system 2 performs the step of retrieving data from a plurality of databases that may impact shipping and delivery. The databases include a first database 120A having cyber-attack data for the industry and/or supplier, a second database 120B including supply availability data for the parts in the industry and/or supplier, a third database 120C including business credit scoring data for the supplier, a fourth database 120D including financial stability data for the supplier, a fifth database 120E including REACH/RoHS data, a sixth database 120F including natural and man-made event data that could impact delivery, a seventh database 120G including EAR/ITAR registry data for the parts, an eighth database 120H including integral supplier performance metric data, and a ninth database 120i including design-to-manufacture control data for the parts, industry and/or supplier. As utilized herein, REACH refers to Registration, Evaluation, Authorization, and Restriction of Chemicals, and RoHS refers to Restriction of Hazardous Substances, where both are EU regulations designed to protect human health and the environment from hazardous substances. ITAR refers to International Traffic in Arms Regulations and EAR refers to Export Administration Regulations, both are United States regulations that govern the export and import of defense-related and dual-use items. Natural event data may relate to weather conditions that impact shipping, such as storms. Man-made event data may relate to, for example, roadwork schedules. It is to be appreciated that these databases are not intended on limiting the scope of the embodiments. The databases may be distributed over a local or wide area network and the server may retrieve the information via one or more wired or wireless protocols. Information obtained in the databases may be obtained utilizing an automated system that, for example, scrapes data from suppliers, shippers, and other relevant information outlets. Scanners and/or sensors may be utilized to capture information at the different sources.

As shown in block 130, in each loop 115, using the information obtained for the part-source pairs, the system 2 performs the step of creating a current risk status vector for each part-source pair that is a function of the data state and data freshness.

Figure 3:
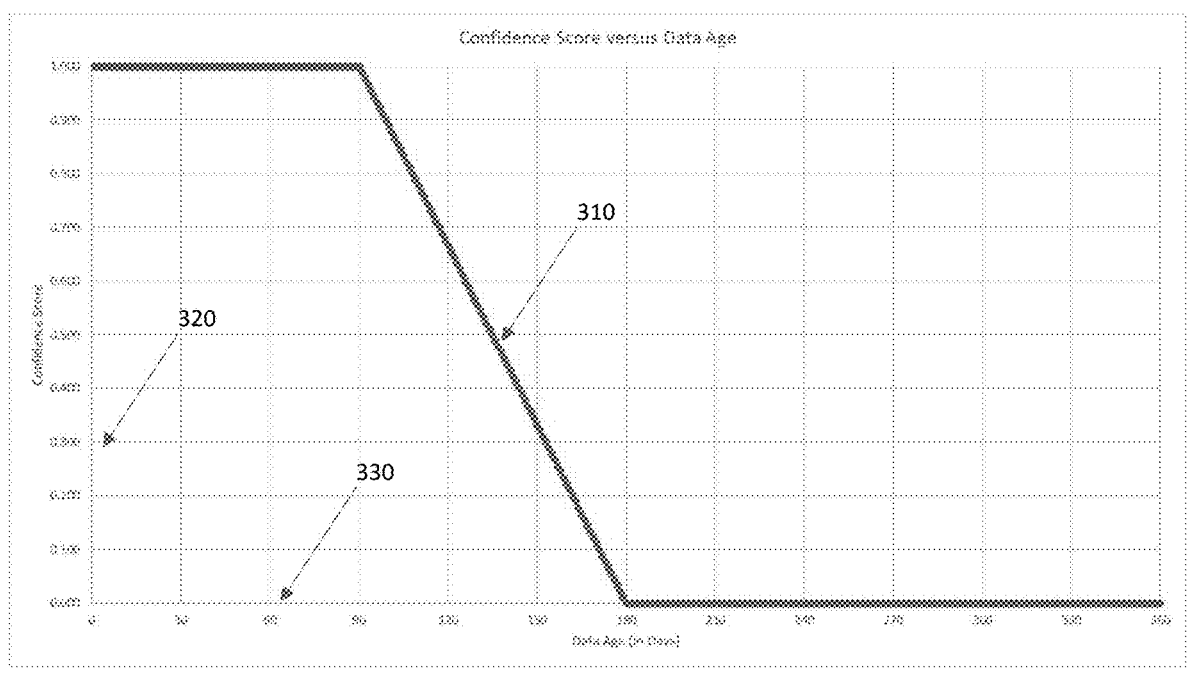
FIG. 3 is a graph of a time-wise decaying confidence score related to data age, utilized to manage supply chain risk.

As shown in block 140, the system 2 performs the step of utilizing the risk status vector created under block 130 to obtain from a tenth database 120J risk weighting vectors by category (e.g., industry or supplier based) and user role, and obtain from an eleventh database 120K time decay (as shown in FIG. 3) and source quality factor data. A source quality is based on where the information was obtained from. For example, a reputable news outlet may have a high score while an internet blog may have a low score.

Remaining with block 140, the system 2 applies the information from the tenth and eleventh databases (the risk weighting vectors, and the time decay and source quality data) to the risk status vector from block 130 and obtains/ calculates a risk score by part-source pair. This risk score by part-source pair is stored in a twelfth database 120L that stores SCRM results history by part-source pair, for further processing.

Figure 4:
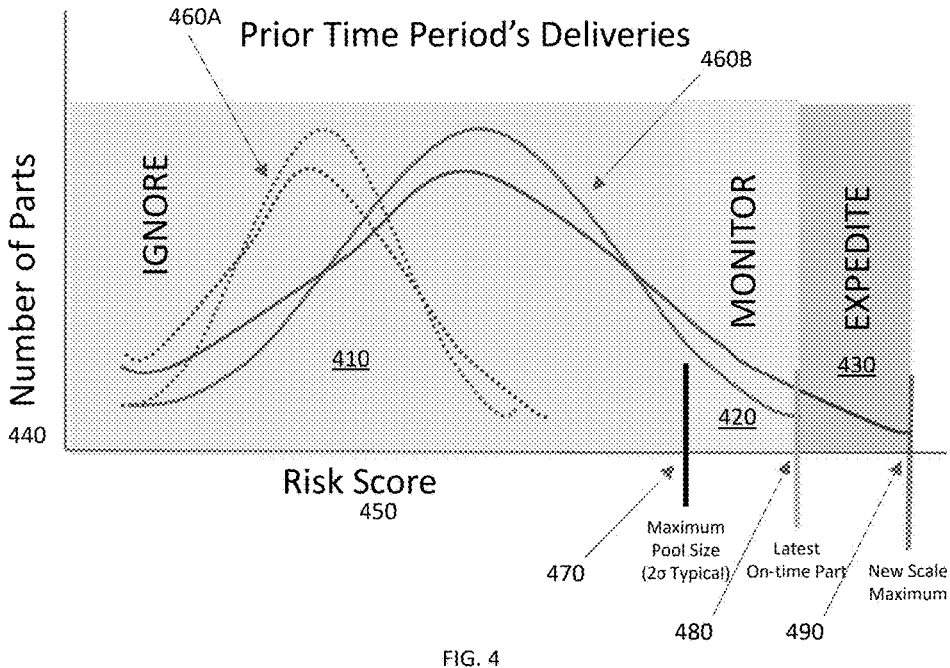
FIG. 4 is a graph showing actions performed as a function of applied risk scores as compared with shipment density, e.g., a number of shipped parts.

Then as shown in block 150 the system 2 again applies the information in the tenth and eleventh databases 120J, 120K (the risk weighting vectors and the time decay and source/ quality data) to the calculated risk score from block 140, to obtain/calculate the confidence score by part-source pair. This information is also fed to the twelfth database 120L as part of the information stored in that database for each part-source pair. FIG. 4 shows a plot of data stored in the twelfth database 120L.

Then at block 160 the system 2 cycles through the process performed between blocks 120 and 150 for each part-source pair until the last part source pair (i=n) at which point the loop ends.

The loop output is utilized at block 170 to evaluate and adjust alarm threshold levels. The threshold levels are illustrated in FIG. 4 as ignore, monitor and expedite, depending on risk score and number of implicated parts, where prior deliveries are graphed to show where they fall relative to the risk level. The process at block 170 of evaluating and adjusting alarm thresholds utilizes data from a thirteenth database 120M to account for prior shipment results from the supplier, including arrival time, quantity and quality of parts. Output from the process at block 170 is stored on a fourteenth database 120N as alarm threshold level data for later processing.

At block 180, the adjusted alarm threshold data (block 170) is utilized to execute scheduled report generation functions. The process at block 180 utilizes the data from the twelfth and fourteenth databases 120L, 120N, i.e., the SCRM results history by part-source pair, and the alarm threshold level data, and data from a fifteenth database 120P having risk alarm override flag data.

At block 190 the system 2 updates the interactive role-based SCRM viewer (FIG. 5) based on the output from block 180, the data in the fifteenth database 120P, i.e., the risk alarm override flag data, the information from the twelfth database 120L, i.e., the SCRM results history by part-source pair, and information from the fourteenth database 120N, i.e., the alarm threshold level data.

Figure 5:
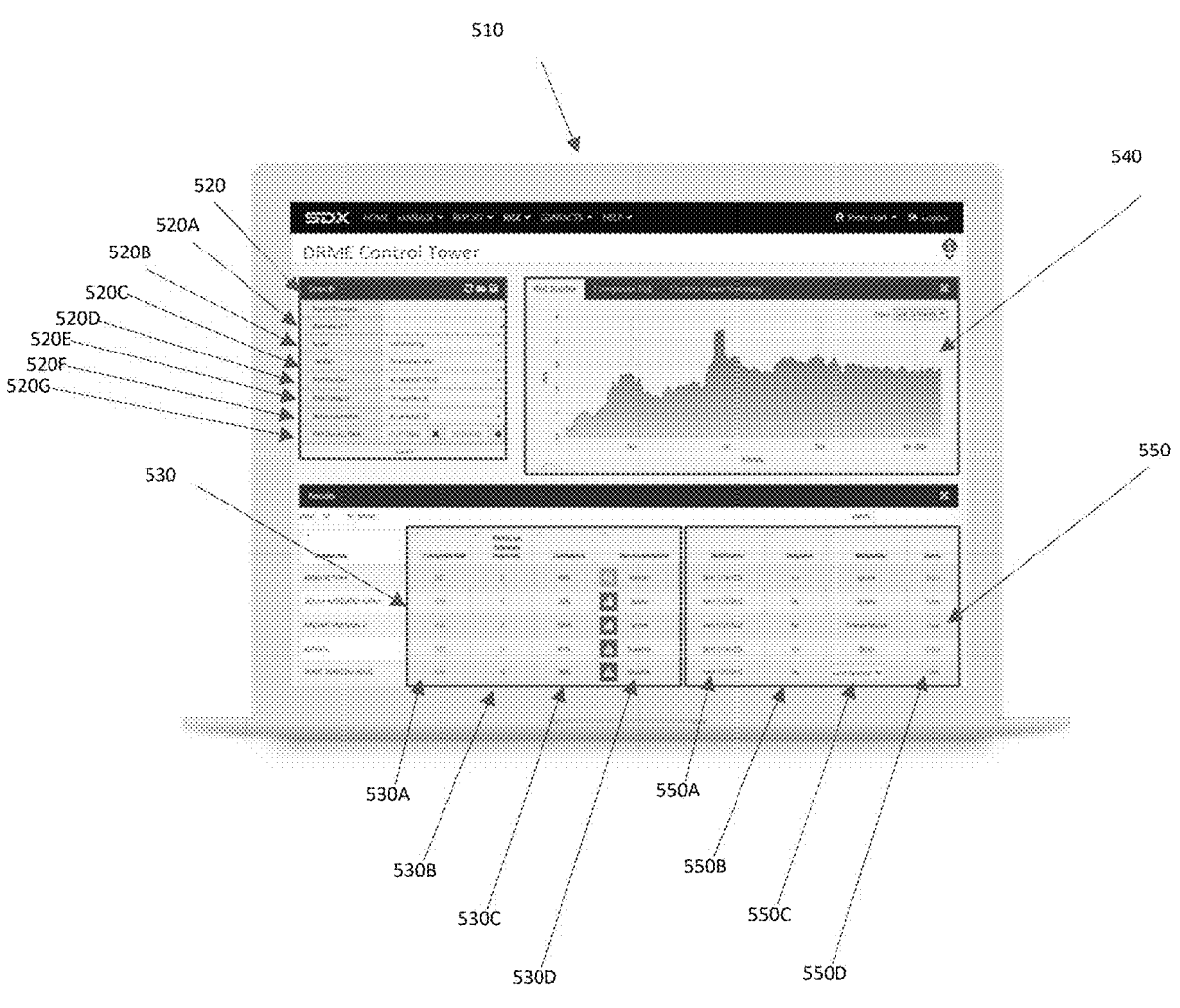
FIG. 5 is a graphical user interface that enables a user to manage supply chain risk, e.g., by adjusting parameters such as weight of processed data.

As shown in FIG. 5 a user can manage supply chain risk, e.g., by adjusting parameters such as weight of processed data that is obtained from the various databases 120, setting alarm limits shown in FIG. 4, adding and removing suppliers, updating categories of data stored in the databases 120, etc. as illustrated in the figure. FIG. 5 also provides graphical illustrations of performance data.

At block 200, the system 2 determines whether there is a request for status information from a supplier. If there is a request for status information from a supplier (Yes at 200) then at block 210 the system 2 determines whether replies have been received from the suppliers. If replies have been received from the suppliers (Yes at 210) then as shown at block 220, the system 2 updates the risk alarm override data, which is then stored in the fifteenth database 120P for use at blocks 180 and 190.

If replies have not been received from the suppliers (No at 210) then as shown at block 230, the process ends. Similarly, if there is no request for status information from a supplier (No at 200) then per block 230, the process ends at block 230.

Turning to FIG. 3, as indicated, a graph 310 shows a change in confidence score on a Y-axis 320 over time on an X-axis 330. Confidence ranges from zero to one, time ranges from zero days to approximately a year, i.e., 360 days. Confidence remains constant for a duration of approximately ninety days then drops proportionally with time until reaching zero at approximately one hundred and eighty days.

Turning to FIG. 4, the image shows threshold levels illustrated as three areas 410, 420, 430, representing ignore, monitor and expedite or prior time period deliverables, depending on risk score and number of implicated parts, where prior deliveries are graphed to show where they fall relative to the risk level. The levels are adjusted as indicated above, accounting for a number of parts in the Y axis 440, a risk score on the X axis 450. Each dashed graph line, e.g., 460A, represents a prior curve for a part-source pair and each solid graph line, e.g., 470B represents an updated curve for the part-source pair. A threshold 470 between ignore and monitor is based on a maximum pool size. A threshold 480 between monitor and expedite is based on a latest on-time part. An outer threshold 490 for expedite is new maximum for the scale.

Turning to FIG. 5, the user display 510 is shown. Specifically, the display is an updatable interactive role-based SCRM viewer. The display includes a search filter section 520. This section enables a user to search based on business unit 520A, buyer 520B, vendor (e.g., source or supplier) 520C, part number 520D (e.g., provided by a particular source), risk category 520E, recommendation 520F, i.e., ignore, monitor, expedite (alert levels) and date range 520G.

The display also includes an impact summary section 530. This section enables the user to see composite risk 530A, the number of impacted parts 530B, the confidence score 530C and the recommendations 530D for each vendor/source/ supplier. The confidence score field reveals completeness/ freshness of underlying data. The parts impacted field reveals parent/child parts impacted for the 'N'-tier suppliers. The ML powered recommendation field helps the user focus on what matters.

The display also includes a trendlines/composite risk section 540. This section shows a composite of risk panels that reveals trends and how composite risks are derived.

The display also includes a mitigation section 550. This section provides a notification feature 550A that automatically sends an email to impacted supplier requesting status. It provide an 'N'-tier supplier response feature 550B that automatically registers a response to the sent email. It also provides a mitigation dropdown feature 550C that allows the user to record the taken mitigation action. Lastly, it includes a status button feature 550D for each sent email that allows user to declutter dashboard by closing line items that are not of interest.

It is to be appreciated that the above processes can be performed utilizing artificial intelligence.

In the above embodiments, sensor data may be obtained and processed separately, or simultaneously and stitched together, or a combination thereof, and may be processed in a raw or complied form. The sensor data may be processed on the sensor (e.g. via edge computing), by controllers identified or implicated herein, on a cloud service, or by a combination of one or more of these computing systems. The senor may communicate the data via wired or wireless transmission lines, applying one or more protocols as indicated below.

Wireless connections may apply protocols that include local area network (LAN, or WLAN for wireless LAN) protocols. LAN protocols include WiFi technology, based on the Section 802.11 standards from the Institute of Electrical and Electronics Engineers (IEEE). Other applicable protocols include Low Power WAN (LPWAN), which is a wireless wide area network (WAN) designed to allow long-range communications at a low bit rates, to enable end devices to operate for extended periods of time (years) using battery power. Long Range WAN (LoRaWAN) is one type of LPWAN maintained by the LoRa Alliance, and is a media access control (MAC) layer protocol for transferring management and application messages between a network server and application server, respectively. LAN and WAN protocols may be generally considered TCP/IP protocols (transmission control protocol/Internet protocol), used to govern the connection of computer systems to the Internet. Wireless connections may also apply protocols that include private area network (PAN) protocols. PAN protocols include, for example, Bluetooth Low Energy (BTLE), which is a wireless technology standard designed and marketed by the Bluetooth Special Interest Group (SIG) for exchanging data over short distances using short-wavelength radio waves. PAN protocols also include Zigbee, a technology based on Section 802.15.4 protocols from the IEEE, representing a suite of high-level communication protocols used to create personal area networks with small, low-power digital radios for low-power low-bandwidth needs. Such protocols also include Z-Wave, which is a wireless communications protocol supported by the Z-Wave Alliance that uses a mesh network, applying low-energy radio waves to communicate between devices such as appliances, allowing for wireless control of the same.

Wireless connections may also include radio-frequency identification (RFID) technology, used for communicating with an integrated chip (IC), e.g., on an RFID smartcard. In addition, Sub-1 Ghz RF equipment operates in the ISM (industrial, scientific and medical) spectrum bands below Sub 1 Ghz—typically in the 769-935 Mhz, 315 Mhz and the 468 Mhz frequency range. This spectrum band below 1 Ghz is particularly useful for RF IOT (internet of things) applications. The Internet of things (IoT) describes the network of physical objects—"things"—that are embedded with sensors, software, and other technologies for the purpose of connecting and exchanging data with other devices and systems over the Internet. Other LPWAN-IOT technologies include narrowband internet of things (NB-IOT) and Category M1 internet of things (Cat M1-IOT). Wireless communications for the disclosed systems may include cellular, e.g. 2G/3G/4G (etc.). Other wireless platforms based on RFID technologies include Near-Field-Communication (NFC), which is a set of communication protocols for low-speed communications, e.g., to exchange date between electronic devices over a short distance. NFC standards are defined by the ISO/IEC (defined below), the NFC Forum and the GSMA (Global System for Mobile Communications) group. The above is not intended on limiting the scope of applicable wireless technologies.

Wired connections may include connections (cables/interfaces) under RS (recommended standard)-422, also known as the TIA/EIA-422, which is a technical standard supported by the Telecommunications Industry Association (TIA) and which originated by the Electronic Industries Alliance (EIA) that specifies electrical characteristics of a digital signaling circuit. Wired connections may also include (cables/interfaces) under the RS-232 standard for serial communication transmission of data, which formally defines signals connecting between a DTE (data terminal equipment) such as a computer terminal, and a DCE (data circuit-terminating equipment or data communication equipment), such as a modem. Wired connections may also include connections (cables/interfaces) under the Modbus serial communications protocol, managed by the Modbus Organization. Modbus is a server/client protocol designed for use with its programmable logic controllers (PLCs) and which is a commonly available means of connecting industrial electronic devices. Wireless connections may also include connectors (cables/interfaces) under the PROFibus (Process Field Bus) standard managed by PROFIBUS & PROFINET International (PI). PROFibus which is a standard for fieldbus communication in automation technology, openly published as part of IEC (International Electrotechnical Commission) 61158. Wired communications may also be over a Controller Area Network (CAN) bus. A CAN is a vehicle bus standard that allow microcontrollers and devices to communicate with each other in applications without a host computer. CAN is a message-based protocol released by the International Organization for Standards (ISO). The above is not intended on limiting the scope of applicable wired technologies.

When data is transmitted over a network between end processors as identified herein, the data may be transmitted in raw form or may be processed in whole or part at any one of the end processors or an intermediate processor, e.g., at a cloud service (e.g. where at least a portion of the transmission path is wireless) or other processor. The data may be parsed at any one of the processors, partially or completely processed or complied, and may then be stitched together or maintained as separate packets of information. Each processor or controller identified herein may be, but is not limited to, a single-processor or multi-processor system of any of a wide array of possible architectures, including field programmable gate array (FPGA), central processing unit (CPU), application specific integrated circuits (ASIC), digital signal processor (DSP) or graphics processing unit (GPU) hardware arranged homogenously or heterogeneously. The memory identified herein may be but is not limited to a random access memory (RAM), read only memory (ROM), or other electronic, optical, magnetic or any other computer readable medium.

The controller may further include, in addition to a processor and non-volatile memory, one or more input and/or output (I/O) device interface(s) that are communicatively coupled via an onboard (local) interface to communicate among other devices. The onboard interface may include, for example but not limited to, an onboard system bus, including a control bus (for inter-device communications), an address bus (for physical addressing) and a data bus (for transferring data). That is, the system bus may enable the electronic communications between the processor, memory and I/O connections. The I/O connections may also include wired connections and/or wireless connections identified herein. The onboard interface may have additional elements, which are omitted for simplicity, such as controllers, buffers (caches), drivers, repeaters, and receivers to enable electronic communications. The memory may execute programs, access data, or lookup charts, or a combination of each, in furtherance of its processing, all of which may be stored in advance or received during execution of its processes by other computing devices, e.g., via a cloud service or other network connection identified herein with other processors.

Embodiments can be in the form of processor-implemented processes and devices for practicing those processes, such as processor. Embodiments can also be in the form of computer code based modules, e.g., computer program code (e.g., computer program product) containing instructions embodied in tangible media (e.g., non-transitory computer readable medium), such as floppy diskettes, CD ROMs, hard drives, on processor registers as firmware, or any other non-transitory computer readable medium, wherein, when the computer program code is loaded into and executed by a computer, the computer becomes a device for practicing the embodiments. Embodiments can also be in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes a device for practicing the exemplary embodiments. When implemented on a general-purpose microprocessor, the computer program code segments configure the microprocessor to create specific logic circuits.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

Those of skill in the art will appreciate that various example embodiments are shown and described herein, each having certain features in the particular embodiments, but the present disclosure is not thus limited. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

I claim:

1. A method for effecting supply chain risk managing (SCRM), the method comprising utilizing an electronics controller to execute steps including:
   (I) identifying part-source pairs for parts that are being shipped by one or more sources;
   (II) for each part-source pair:
      (i) retrieving data from a plurality of databases that impact shipping and delivery;
      (ii) obtaining a current risk status vector for each part-source pair that is a function of a data state and a data freshness of the retrieved data;
      (iii) utilizing the current risk status vector to:
         (a) obtain, from respective databases, risk weighting vectors by category and user role, time decay and source quality factor data; and
         (b) apply the risk weighting vectors, time decay and source quality factor data to the risk status vector to obtain a risk score by part-source pair; and
         (c) store the risk score by part-source pair in a SCRM database;
      (iv) applying the risk weighting vectors and the time decay and source quality data with the risk score by part-source pair to obtain a confidence score by part-source pair;
      (v) storing the confidence score by part-source pair in the SCRM database;
   (III) evaluating, adjusting and storing alarm threshold levels, which are triggered based on the risk score by part-source pair, and a number of the parts subject to the part-source pair, and accounting for prior shipment results from the source, including arrival time, quantity and quality of the parts; and
   (IV) issuing an alarm when the risk score by part-source pair, and a number of the parts subject to the part-source pair, is above the alarm threshold level.

2. The method of claim 1, wherein the databases include one or more of:
   a first database having cyber-attack data for the industry and/or the source of parts;
   a second database including supply availability data for the parts industry-wide and/or for the suppler;
   a third database including business credit scoring data for the source of parts;
   a fourth database including financial stability data for the source of parts;
   a fifth database including REACH/RoHS data;
   a sixth database including natural and man-made event data that impacts delivery;

a seventh database including EAR/ITAR registry data for the parts;

an eighth database including integral performance metric data for the source of parts; and a ninth database including design-to-manufacture control data for the parts, industry and/or the source of parts.

3. The method of claim 2, wherein the natural event data identifies weather conditions and the man-made event data identifies roadwork schedules.

4. The method of claim 1, wherein the risk weighting vectors by category are industry based or risk weighting vectors based on the source of parts.

5. The method of claim 1, wherein the alarm threshold levels are ignore, monitor and expedite.

6. The method of claim 1, comprising utilizing the adjusted alarm threshold data to execute scheduled report generation functions, which includes utilizing the SCRM results history by part-source pair, and the alarm threshold level data, and risk alarm override flag data from a respective database.

7. The method of claim 6, comprising updating an interactive role-based SCRM viewer based on the risk alarm override flag data, the SCRM results history by part-source pair, and the alarm threshold level data.

8. The method of claim 7, comprising receiving, as user input, one or more of an adjusting of parameters including weight of processed data that is obtained from the databases, setting alarm limits, adding and removing a source of parts, updating categories of data stored in the databases.

9. The method of claim 7, comprising determining that a source of parts has updated a delivery status and responsively updating the risk alarm override flag.

10. The method of claim 1, including transmitting the alert to a shipment management server for display on a server display.

11. A system that effects supply chain risk managing (SCRM), the system comprising an electronics controller configured to execute steps including:

(I) identifying part-source pairs for parts that are being shipped by one or more sources;

(II) for each part-source pair:

(i) retrieving data from a plurality of databases that impact shipping and delivery;

(ii) obtaining a current risk status vector for each part-source pair that is a function of a data state and a data freshness of the retrieved data;

(iii) utilizing the current risk status vector to:

(a) obtain, from respective databases, risk weighting vectors by category and user role, time decay and source quality factor data; and (b) apply the risk weighting vectors, time decay and source quality factor data to the risk status vector to obtain a risk score by part-source pair; and (c) store the risk score by part-source pair in a SCRM database;

(iv) applying the risk weighting vectors and the time decay and source quality data with the risk score by part-source pair to obtain a confidence score by part-source pair;

(v) storing the confidence score by part-source pair in the SCRM database;

(III) evaluating, adjusting and storing alarm threshold levels, which are triggered based on the risk score by part-source pair, and a number of the parts subject to the part-source pair, and accounting for prior shipment results from the source, including arrival time, quantity and quality of the parts; and (IV) issuing an alarm when the risk score by part-source pair, and a number of the parts subject to the part-source pair, is above the alarm threshold level.

12. The system of claim 11, wherein the databases include one or more of:

a first database having cyber-attack data for the industry and/or the source of parts;

a second database including supply availability data for the parts industry-wide and/or for the suppler;

a third database including business credit scoring data for the source of parts;

a fourth database including financial stability data for the source of parts;

a fifth database including REACH/RoHS data;

a sixth database including natural and man-made event data that impacts delivery;

a seventh database including EAR/ITAR registry data for the parts;

an eighth database including integral performance metric data for the source of parts; and a ninth database including design-to-manufacture control data for the parts, industry and/or the source of parts.

13. The system of claim 12, wherein the natural event data identifies weather conditions and the man-made event data identifies roadwork schedules.

14. The system of claim 11, wherein the risk weighting vectors by category are industry based or risk weighting vectors based on the source of parts.

15. The system of claim 11, wherein the alarm threshold levels are ignore, monitor and expedite.

16. The system of claim 11, comprising the controller utilizing the adjusted alarm threshold data to execute scheduled report generation functions, which includes utilizing the SCRM results history by part-source pair, and the alarm threshold level data, and risk alarm override flag data from a respective database.

17. The system of claim 16, comprising the controller updating an interactive role-based SCRM viewer based on the risk alarm override flag data, the SCRM results history by part-source pair, and the alarm threshold level data.

18. The system of claim 17, comprising the controller receiving, as user input, one or more of an adjusting of parameters including weight of processed data that is obtained from the databases, setting alarm limits, adding and removing a source of parts, updating categories of data stored in the databases.

19. The method of claim 17, comprising the controller determining that a source of parts has updated a delivery status and responsively updating the risk alarm override flag.

20. The system of claim 11, including the controller transmitting the alert to a shipment management server for display on a server display.

* * * * *